United States Patent
Chen

(10) Patent No.: US 6,598,168 B1
(45) Date of Patent: Jul. 22, 2003

(54) COMPUTER AUTO SHUT-OFF CONTROL METHOD

(75) Inventor: Jerry Chen, Taipei Hsien (TW)

(73) Assignee: Power Digital Communications Co. Ltd, Taipei Hsien (TW)

( * ) Notice: Subject to any disclaimer, the term of this patent is extended or adjusted under 35 U.S.C. 154(b) by 0 days.

(21) Appl. No.: 09/567,221

(22) Filed: May 9, 2000

(51) Int. Cl.[7] .................................................. G06F 1/26
(52) U.S. Cl. ........................................ 713/300; 713/330
(58) Field of Search ................................. 713/300, 310, 713/320, 330, 340

(56) References Cited

U.S. PATENT DOCUMENTS

| | | | | | |
|---|---|---|---|---|---|
| 4,478,274 A | * | 10/1984 | Naganoma et al. | ......... | 165/204 |
| 4,733,101 A | * | 3/1988 | Graham et al. | ............ | 307/10.1 |
| 5,375,247 A | * | 12/1994 | Hueser | ........................ | 713/330 |
| 6,367,022 B1 | * | 4/2002 | Gillespie et al. | ............ | 713/300 |
| 6,393,573 B1 | * | 5/2002 | Gillespie et al. | ............ | 713/324 |

* cited by examiner

Primary Examiner—Dennis M. Butler

(57) ABSTRACT

A computer auto shut-off control method used in a vehicle to shut off a computer in the vehicle subject to a normal procedure when the ignition switch of the vehicle is shut off abnormally. The method includes the step of installing a shut-off controller in between the personal computer and the battery power supply of the vehicle, enabling the shut-off controller to monitor the status of battery power supply and the status of the personal computer, to send an OFF signal to drive the personal computer into the shut-off mode when the ignition switch of the vehicle is off and the power switch of the personal computer is on, and to cut off power supply from the personal computer when receive a feedback OFF recognition signal from the personal computer.

12 Claims, 2 Drawing Sheets

COMPUTER AUTO SHUT-OFF CONTROL METHOD

BACKGROUND OF THE INVENTION

The present invention relates to a computer auto shut-off control method used in a vehicle to automatically shuts off a personal computer in the vehicle when the ignition switch of the vehicle is switched off abnormally.

Following fast development of high technology, a variety of compact personal computers including mobile computers, notebook computers, palm-top computers, and etc., have been disclosed, and have appeared on the market. A vehicle may be installed with a computer for GPS (global positioning system) control as well as other commercial or entertainment purposes (word processing, data processing, VCD playing, and etc.). The application of a computer realizes the concept of "mobile office". When a computer is used, stable power supply is requisite. A computer used in a vehicle may obtain power supply from the ignition switch (ACC key switch) of the vehicle, or directly from the engine battery. If a computer, which obtains power supply from the ignition switch (ACC key switch) of a vehicle, is not turned off before turning off the ignition switch, the computer may be damaged easily. If a computer obtains power supply directly from the engine battery of a vehicle, the power of the engine battery may be consumed in vain when the computer is off.

SUMMARY OF THE INVENTION

The present invention has been accomplished under the circumstances in view. According to one aspect of the present invention, the computer auto shut-off control method automatically sends an OFF signal to the computer to drive the computer into the shut-off mode after the ignition switch of the vehicle is off, and then automatically cut off power supply from the computer. According to another aspect of the present invention, the method comprises the step of installing a shut-off controller in between the personal computer and the battery power supply of the vehicle, enabling the shut-off controller to monitor the status of battery power supply and the status of the personal computer, to send an OFF signal to drive the personal computer into the shut-off mode when the ignition switch of the vehicle is off and the power switch of the personal computer is on, and to cut off power supply from the personal computer when receive a feedback OFF recognition signal from the personal computer. According to still another aspect of the present invention, the method further comprises a step of waiting a predetermined length of time before sending an OFF signal to the computer after the ignition switch of the vehicle is off. According to still another aspect of the present invention, the computer auto shut-off control method comprises the steps of: (a) monitoring the status of the ignition switch of the vehicle and initializing the shut-off controller when the ignition switch of the vehicle is on; (b) monitoring the status of the power switch of the computer; (c) driving the shut-off controller to provide power supply to the computer when the power switch of the computer is switched on, enabling the computer to enter normal working status; (d) sending an OFF signal to the computer when the ignition switch of the vehicle is off, and then waiting a feedback OFF recognition signal from the computer; (e) cutting off power supply from the computer immediately upon or a predetermined length of time after receipt of a feedback OFF recognition signal from the computer. According to still another aspect of the present invention, the method further comprises the step of automatically cutting off power supply from the computer when the shut-off controller received no feedback OFF recognition signal from the computer after the predetermined length of waiting time is up

DETAILED DESCRIPTION OF THE PREFERRED EMBODIMENT

Figure 1:
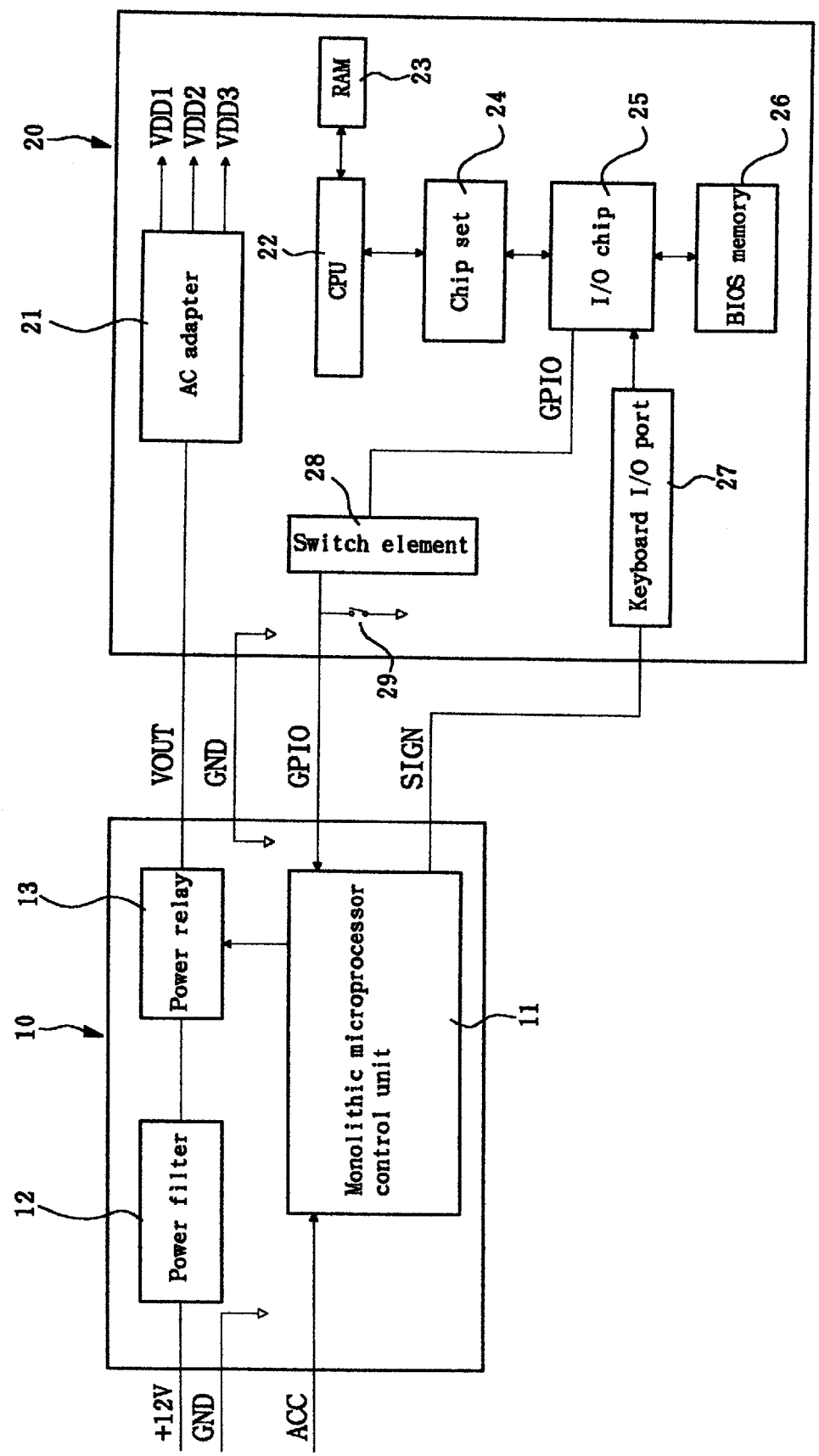
FIG. 1 is a circuit block diagram of the present invention.

The present invention provides a computer auto shut-off control method, which enables the computer in a vehicle to automatically cut off power supply when entering off mode.

The present invention can be used in an aircraft, vessel, or any of a variety of vehicles. In the embodiment shown in FIG. 1, the invention is used in a car. As illustrated, a shut-off controller 10 is connected between a personal computer 20 and the circuit of battery power supply +12V and ignition switch ACC. The shut-off controller 10 comprises a power filter 12 connected to battery power supply +12V, a power relay 13, and a mono-chip microprocessor control unit 11, which controls the power relay 13. The output end VOUT of the power relay 13 is the main power terminal for the personal computer 20, i.e., the shut-off controller 10 controls power supply to the personal computer 20. The monolithic microprocessor control unit 11 comprises a first input end, which monitors the status of the ignition switch ACC of the car, a second input end, which is connected to a power switch 29 of the personal computer 20 to receive on or off recognition signal from the personal computer 20, and an output end SIGN, which is controlled to send an off signal to a keyboard I/O port (or RS232 connector) 27 of the personal computer 20, causing the personal computer 20 to shut off automatically.

Similar to regular personal computers, the personal computer 20 comprises a CPU 22, a RAM (random access memory) 23, a chip set 24, an I/O chip 25, a BIOS memory 26, the aforesaid keyboard I/O port (or RS232 connector) 27, and an AC adapter 21. The I/O chip 25 comprises a recognition signal output port, which forms with a switch element 28 a recognition signal output end GPIO, which is in turn connected to the shut-off controller 10. The aforesaid power switch 29 is bridged to the recognition signal output end GPIO, so that an ON recognition signal can be sent through the recognition signal output end GPIO to the shut-off controller 10, causing the shut-off controller 10 to provide power supply to the personal computer 20 for normal operation.

A resident program is installed in the personal computer 20. The resident program receives an ON signal SIGN from the shut-off controller 10 when the personal computer is turned on, and then sends a recognition signal GPIO to the shut-off controller 10 to complete the control. Alternatively, a hardware arrangement can be used to achieve the effect of the resident program.

The computer auto shut-off control system shown in FIG. 1 receives the signal of the ignition switch ACC of the car, automatically sends out OFF signal SIGN, and receives feedback recognition signal GPIO. When the ignition switch of the car is switched off, the computer auto shut-off control system automatically shuts off the personal computer, and then cuts off power supply from the personal computer. The shut-off controller 10 can be directly integrated to the personal computer 20.

Figure 2:
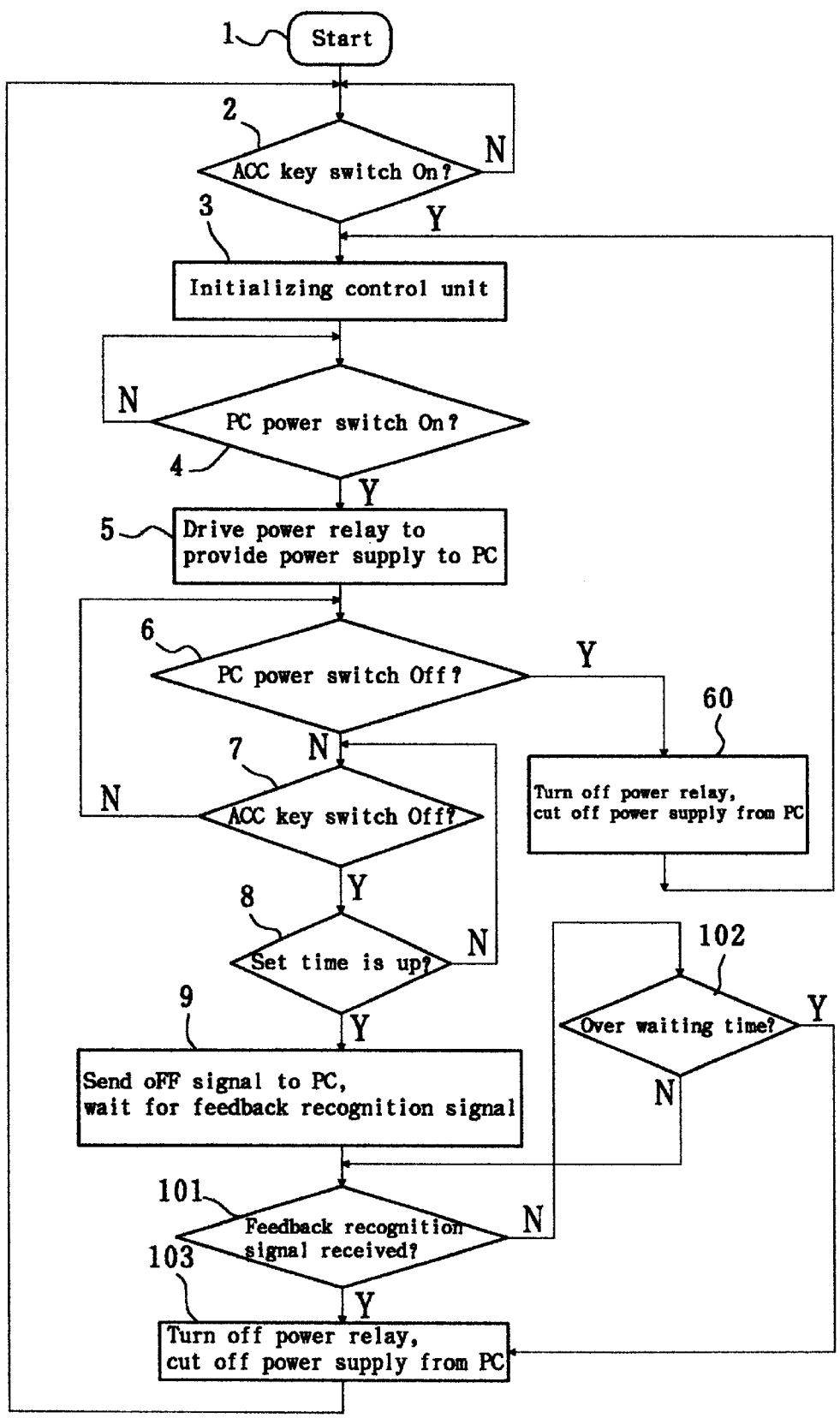
FIG. 2 is a control flow chart of the present invention.

The computer auto shut-off control method of the present invention is outlined hereinafter with reference to FIG. 2. When started (step 1), it enters step (2) to detect the status of the ignition switch of the car, and then proceeds to step (3) to initialize the mono-chip microprocessor control unit of the shut-off controller when the ignition switch of the car is on, and then proceeds to step (4) to detect if the power switch of the personal compute has been switched on or not, and then proceeds to step (5) to trigger the power relay or the like when the power switch of the personal computer is on, and then proceeds to step (6) to detect if the power switch of the personal computer has been switched off or not. If the power switch of the computer has been manually touched (it means the personal computer has been manually shut off, and the system immediately enters step (60) to turn off the power relay or the like, and then to cut off power supply from the personal computer. If the power switch of the computer is not touched, the system immediately enters step (7) to detect if the ignition switch of the car has been switched off or not. If the ignition switch of the car has been switched off at this stage, the system enters step (8) to count the off time of the ignition switch of the car, and then enters step (9) to send an OFF signal to the personal computer and to wait for a feedback OFF recognition signal from the personal computer when a predetermined length of time delay (about 5~11 seconds) is up. After step (9), the system enters step (101) to detect the receipt of a feedback recognition signal, and then enters step (102) to check if the feedback OFF recognition signal has been received from the personal computer or not, or to count a predetermined length of waiting time (about 30~60 seconds) when receiving no feedback signal from the personal computer (it means the personal computer fails, or is unable to be turned off normally when no feedback signal is received within the predetermined length of waiting time). After step (102), the system enters step (103) to cut off main power from the personal computer.

As an alternate form of the present invention, the recognition signal GPIO may be eliminated, and an internal timer directly cuts off power supply from the personal computer a predetermined length of time delay after sending of the OFF signal by the shut-off controller to the personal computer.

It is to be understood that the drawings are designed for purposes of illustration only, and are not intended for use as a definition of the limits and scope of the invention disclosed.

What the invention claimed is:

1. A computer auto shut-off control method comprising the steps of:
   (a). installing a shut-off controller in between a personal computer and the battery power supply of a vehicle;
   (b) providing an input/output port with said personal computer to receive an OFF signal and to send an ON/OFF recognition signal;
   (c) driving said shut-off controller to receive an ON/OFF signal from the ignition switch of said vehicle, to receive an ON/OFF recognition signal from said input/output port, and to send an OFF signal to said personal computer through said input/output port;
   (d) connecting said battery power supply to said personal computer when the ignition switch of said vehicle and the power switch of said personal computer are switched on;
   (e) sending an OFF signal to said personal computer to drive said personal computer into a shut-off mode when the ignition switch of said vehicle is off and said personal computer is not shut off; and
   (f) waiting a feedback OFF recognition signal from said personal computer, and then automatically cutting off power supply from said personal computer after receipt of a feedback OFF recognition signal from said personal computer.

2. The computer auto shut-off control method of claim 1 wherein said shut-off controller comprises a power filter to receive and filtrate battery power supply from said vehicle, a control unit to process external incoming signal and internal outgoing driving signal, and means controlled by said control unit to connect power supply to or cut off power supply from said personal computer.

3. The computer auto shut-off control method of claim 1 further comprising the step of counting the off time of the ignition switch of said vehicle subject to a predetermined length of time before sending an OFF signal to said personal computer to drive said personal computer into a shut-off mode when the ignition switch of said vehicle is off and said personal computer is not shut off.

4. The computer auto shut-off control method of claim 3 wherein said predetermined length of time is set within about 5~11 seconds.

5. The computer auto shut-off method of claim 1 further comprising the step of counting the waiting time subject to a predetermined length of time when waiting a feedback OFF recognition signal from said personal computer and before cutting off power supply from said personal computer after receipt of a feedback OFF recognition signal from said personal computer.

6. The computer auto shut-off method of claim 5 wherein said predetermined length of time is set within about 30~60 seconds.

7. The computer auto shut-off method of claim 5 further comprising the step of automatically cutting off power supply from said personal computer when said shut-off controller received no feedback OFF recognition signal from said personal computer after said predetermined length of time is up.

8. A computer auto shut-off control method comprising the steps of:
   (a). installing a shut-off controller in between a personal computer and the battery power supply of a vehicle;
   (b) providing an input/output port with said personal computer to receive an OFF signal and to send an ON/OFF recognition signal;
   (c) driving said shut-off controller to receive an ON/OFF signal from the ignition switch of said vehicle, to receive an ON/OFF recognition signal from said input/output port, and to send an OFF signal to said personal computer through said input/output port;
   (d) connecting said battery power supply to said personal computer when the ignition switch of said vehicle and the power switch of said personal computer are switched on;
   (e) sending an OFF signal to said personal computer to drive said personal computer into a shut-off mode when the ignition switch of said vehicle is off and said personal computer is not shut off;
   (f) automatically sending an OFF signal to said personal computer to drive said personal computer into a shut-off mode when the ignition switch of said vehicle is off and said personal computer is not shut off; and
   (g) automatically cutting off power supply from said personal computer after waiting a predetermined length of time delay.

9. The computer auto shut-off control method of claim 8 wherein said shut-off controller comprises a power filter to receive and filtrate battery power supply from said vehicle, a control unit to process external incoming signal and internal outgoing driving signal, and means controlled by said control unit to connect power supply to or cut off power supply from said personal computer.

10. The computer auto shut-off control method of claim 8 further comprising the step of counting the off time of the ignition switch of said vehicle subject to a predetermined length of time before sending an OFF signal to said personal computer to drive said personal computer into a shut-off mode when the ignition switch of said vehicle is off and said personal computer is not shut off.

11. The computer auto shut-off control method of claim 10 wherein said predetermined length of time is set within about 5~11 seconds.

12. The computer auto shut-off method of claim 8 wherein said predetermined length of time delay is set within about 30~60 seconds.

* * * * *